(12) United States Patent
Burnside et al.

(10) Patent No.: US 10,557,372 B2
(45) Date of Patent: Feb. 11, 2020

(54) SYSTEMS AND METHODS FOR ASSESSING STRAIN OF COMPONENTS IN TURBOMACHINES

(71) Applicant: General Electric Company, Schenectady, NY (US)

(72) Inventors: Jason Lee Burnside, Greenville, SC (US); Thomas James Batzinger, Burnt Hills, NY (US); Bryan Joseph Germann, Greenville, SC (US); Gregory Lee Hovis, Martinez, GA (US); William Farris Ranson, Columbia, SC (US)

(73) Assignee: General Electric Company, Schenectady, NY (US)

( * ) Notice: Subject to any disclaimer, the term of this patent is extended or adjusted under 35 U.S.C. 154(b) by 393 days.

(21) Appl. No.: 14/972,221

(22) Filed: Dec. 17, 2015

(65) Prior Publication Data

US 2017/0175566 A1    Jun. 22, 2017

(51) Int. Cl.
*G01M 5/00* (2006.01)
*F01D 25/24* (2006.01)
(Continued)

(52) U.S. Cl.
CPC .............. *F01D 21/003* (2013.01); *F01D 5/02* (2013.01); *F01D 5/12* (2013.01); *F01D 9/023* (2013.01); *F01D 9/04* (2013.01); *F01D 15/10* (2013.01); *F01D 25/24* (2013.01); *F04D 27/001* (2013.01); *F04D 29/324* (2013.01); *F04D 29/542* (2013.01); *F04D 29/545* (2013.01); *G01M 5/0016* (2013.01); *G01M 5/0041* (2013.01); *G01M 5/0091* (2013.01); (Continued)

(58) Field of Classification Search
CPC ... F01D 5/02; F01D 5/12; F01D 9/023; F01D 9/04; F01D 15/10; F01D 25/24; G01M 5/0016; G01M 5/0041; G01M 5/0091; G01M 5/14
See application file for complete search history.

(56) References Cited

U.S. PATENT DOCUMENTS 4,227,842 A   10/1980   Samanta et al.
4,323,325 A    4/1982   Samanta et al.
(Continued)

FOREIGN PATENT DOCUMENTS

EP    0009859 B1    11/1984
EP    2 469 258 A2   6/2012
(Continued)

OTHER PUBLICATIONS

Extended European Search Report and Opinion issued in connection with corresponding EP Application No. 16203162.9 dated May 18, 2017.

*Primary Examiner* — Natalie Huls
(74) *Attorney, Agent, or Firm* — Charlotte C. Wilson; James W. Pemrick

(57) ABSTRACT

Systems for monitoring a component in a turbomachine can include a strain sensor comprising at least two reference points disposed on a surface of the component, and a data acquisition device connected to the turbomachine comprising a field of view, wherein the field of view is positioned to at least periodically capture the strain sensor on the component.

11 Claims, 3 Drawing Sheets

(51) Int. Cl.
  *G01M 15/14* (2006.01)
  *F01D 5/02* (2006.01)
  *F01D 5/12* (2006.01)
  *F01D 9/02* (2006.01)
  *F01D 9/04* (2006.01)
  *F01D 21/00* (2006.01)
  *F01D 15/10* (2006.01)
  *F04D 27/00* (2006.01)
  *F04D 29/32* (2006.01)
  *F04D 29/54* (2006.01)

(52) U.S. Cl.
  CPC ......... *G01M 15/14* (2013.01); *F05D 2220/31* (2013.01); *F05D 2220/32* (2013.01)

(56) References Cited

U.S. PATENT DOCUMENTS

| | | | |
|---|---|---|---|
| 4,580,524 A | 4/1986 | Lackey, Jr. et al. | |
| 5,418,003 A | 5/1995 | Bruce et al. | |
| 5,465,780 A | 11/1995 | Muntner et al. | |
| 5,689,332 A | 11/1997 | Ellingson et al. | |
| 6,074,706 A | 6/2000 | Beverley et al. | |
| 6,078,396 A * | 6/2000 | Manzouri | G01B 11/167 356/496 |
| 6,251,504 B1 | 6/2001 | Jaslier et al. | |
| 6,432,478 B2 | 8/2002 | Jaslier et al. | |
| 7,377,181 B2 * | 5/2008 | Christ, Jr. | G01L 1/247 356/35.5 |
| 7,533,818 B2 | 5/2009 | Hovis et al. | |
| 7,819,182 B2 * | 10/2010 | Adamek | G01L 1/25 166/66 |
| 8,191,784 B2 * | 6/2012 | Hovis | G06K 19/06037 235/462.09 |
| 8,245,578 B2 | 8/2012 | Ranson et al. | |
| 8,459,567 B2 * | 6/2013 | Hovis | G01M 5/0091 235/462.01 |
| 8,581,736 B2 * | 11/2013 | McIver | G01M 5/0091 340/665 |
| 8,727,831 B2 | 5/2014 | Nelson et al. | |
| 9,243,895 B2 * | 1/2016 | Allen | G01D 5/34746 |
| 9,557,164 B2 | 1/2017 | Burnside et al. | |
| 9,953,408 B2 * | 4/2018 | Burnside | F01D 5/02 |
| 2001/0008708 A1 | 7/2001 | Jaslier et al. | |
| 2006/0108807 A1 * | 5/2006 | Bouiller | F01D 15/10 290/52 |
| 2006/0289652 A1 * | 12/2006 | Hovis | G01B 11/165 235/462.09 |
| 2009/0311416 A1 | 12/2009 | Nelson et al. | |
| 2010/0310128 A1 * | 12/2010 | Iliopoulos | G01B 11/165 382/103 |
| 2012/0101775 A1 * | 4/2012 | Mitchell | F01D 21/003 702/183 |
| 2012/0166102 A1 * | 6/2012 | Nieters | G01M 5/0016 702/34 |
| 2013/0202192 A1 | 8/2013 | Telfer et al. | |
| 2015/0107368 A1 * | 4/2015 | Harding | G01N 3/08 73/822 |
| 2018/0171985 A1 * | 6/2018 | Grunnet | G01S 17/89 |
| 2018/0238755 A1 * | 8/2018 | Hovis | F01D 17/04 |
| 2018/0292275 A1 * | 10/2018 | Byers | F01D 17/04 |

FOREIGN PATENT DOCUMENTS

| | | | |
|---|---|---|---|
| EP | 2 950 073 A1 | 12/2015 | |
| WO | WO 2012110188 A1 * | 8/2012 | ......... F03D 7/0292 |
| WO | 2013075202 A1 | 5/2013 | |

* cited by examiner

SYSTEMS AND METHODS FOR ASSESSING STRAIN OF COMPONENTS IN TURBOMACHINES

FIELD OF THE INVENTION

The present disclosure relates generally to systems and methods for monitoring components, and more particularly to systems and methods which align data acquisition devices with surface features for monitoring the components in turbomachines.

BACKGROUND OF THE INVENTION

Some components may need to operate in environments comprising elevated temperatures and/or corrosive conditions. For example, turbomachines are widely utilized in fields such as power generation and aircraft engines. Depending on the overall configuration of the turbomachine (i.e., the incorporation of gas turbines, steam turbines and/or generators), such turbomachine systems may including one or more compressor sections, combustor sections, turbine sections, steam path sections and/or generator sections. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads. The steam path section may utilize the flow of any steam in the turbomachine system (such as that created from a heat recovery steam generator) to extract energy from it for power generation. Likewise, the generator section may covert rotational movement from a turbine section (e.g., gas or steam turbine section) into electricity.

During operation of a turbomachine, various components (collectively known as turbine components) within the turbomachine and particularly within the turbine section or generator section of the turbomachine, such as turbine blades, may be subject to creep due to high temperatures and stresses. For turbine blades, creep may cause portions of or the entire blade to elongate so that the blade tips contact a stationary structure, for example a turbine casing, and potentially cause unwanted vibrations and/or reduced performance during operation.

Accordingly, components may be monitored for creep. One approach to monitoring components for creep is to configure strain sensors on the components, and analyze the strain sensors at various intervals to monitor for deformations associated with creep strain. However, such methods may require removal of the components from the turbomachine or otherwise require extended stoppage of the turbomachine.

Accordingly, alternative systems and methods for monitoring components in turbomachines would be welcome in the art.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a system for monitoring a component in a turbomachine is disclosed. The system can include a strain sensor comprising at least two reference points disposed on a surface of the component, and a data acquisition device connected to the turbomachine comprising a field of view, wherein the field of view is positioned to at least periodically capture the strain sensor on the component.

In accordance with another embodiment of the present disclosure, a system for monitoring a set of components in a turbomachine is disclosed. The system can include the set of components a plurality of strain sensors comprising at least two reference points, wherein at least one strain sensor is disposed on a surface of at least two components of the set of components, and a data acquisition device connected to the turbomachine comprising a field of view, wherein the field of view is positioned to at least periodically capture the strain sensors on the at least two components of the set of components.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
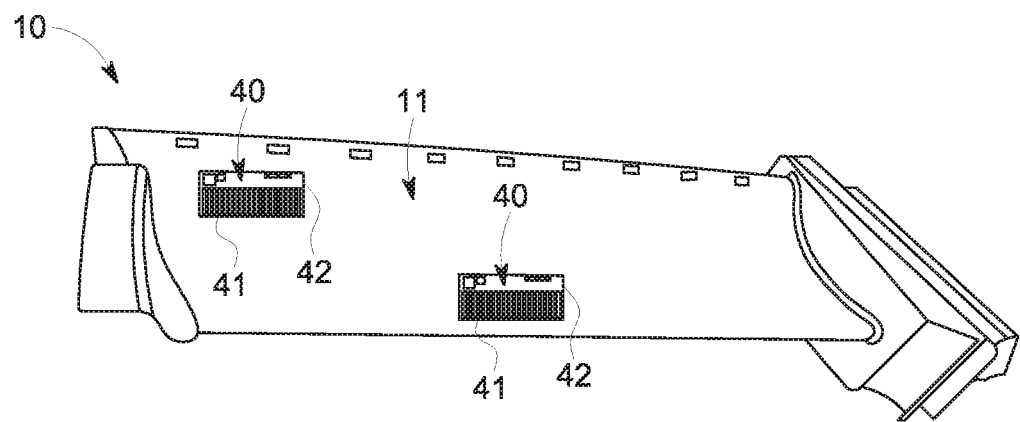
FIG. 1 is a perspective view of an exemplary component comprising a plurality of surface features in accordance with one or more embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, a component 10 is illustrated with plurality of surface features, in these embodiments strain sensors 40, configured thereon. The component 10 can comprise a variety of types of components used in a turbomachine such as in high temperature applications (e.g., components comprising nickel or cobalt based superalloys). It should be appreciated that as used herein, a turbomachine can include one or more gas turbine, steam turbine and/or generator systems. Accordingly, in some embodiments, the component 10 may comprise an industrial gas turbine, steam turbine or generator component such as a combustion component, hot gas path component, steam path component or generator component. In some embodiments, the component 10 may comprise a turbine blade, compressor blade, vane, nozzle, shroud, rotor, transition piece or casing. In other embodiments, the component 10 may comprise any other component of a turbomachine such as any other component for a gas turbine, steam turbine or the like.

The component 10 has an exterior surface 11 on or beneath which strain sensors 40 may be configured. Strain sensors 40 in accordance with the present disclosure may be configured on the exterior surface 11 using any suitable techniques, including deposition techniques; other suitable additive manufacturing techniques; subtractive techniques such as laser ablation, engraving, machining, etc.; appearance-change techniques such as annealing, direct surface discoloration, or techniques to cause local changes in reflectivity; mounting of previously formed strain sensors 40 using suitable mounting apparatus or techniques such as adhering, welding, brazing, etc.; or identifying pre-existing characteristics of the exterior surface 11 that can function as the components of a strain sensor 40. Additionally, in further alternative embodiments, strain sensors 40 can be configured beneath exterior surface 11 using suitable embedding techniques during or after manufacturing of the component 10.

Figure 2:
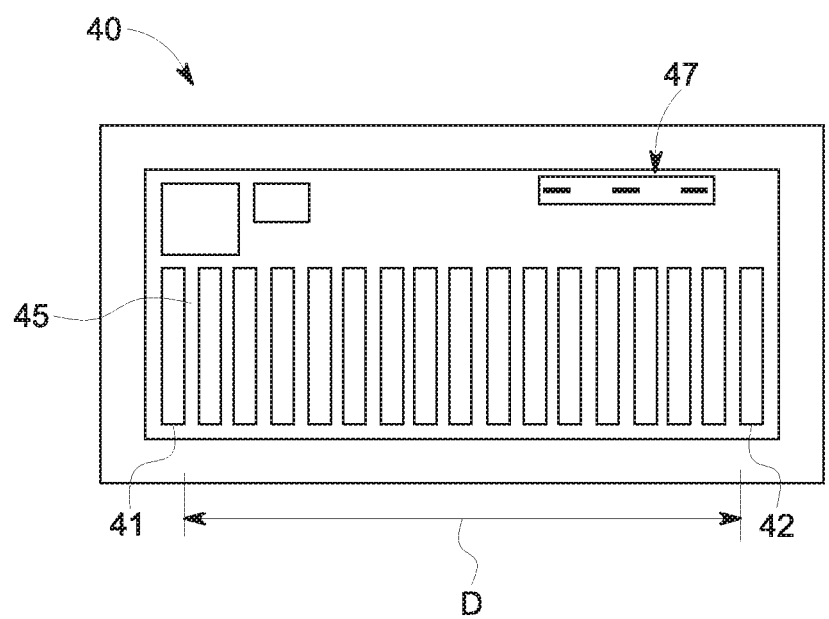
FIG. 2 is a top view of an exemplary strain sensor in accordance with one or more embodiments of the present disclosure.

Referring now to FIGS. 1 and 2, a strain sensor 40 generally comprises at least two reference points 41 and 42 that can be used to measure a distance D between said at least two reference points 41 and 42 at a plurality of time intervals. As should be appreciated to those skilled in the art, these measurements can help determine the amount of strain, strain rate, creep, fatigue, stress, etc. at that region of the component 10. The at least two reference points 41 and 42 can be disposed at a variety of distances and in a variety of locations depending on the specific component 10 so long as the distance D there between can be measured. Moreover, the at least two reference points 41 and 42 may comprise dots, lines, circles, boxes or any other geometrical or non-geometrical shape so long as they are consistently identifiable and may be used to measure the distance D there between.

The strain sensor 40 may comprise a variety of different configurations and cross-sections such as by incorporating a variety of differently shaped, sized, and positioned reference points 41 and 42. For example, as illustrated in FIG. 2, the strain sensor 40 may comprise a variety of different reference points comprising various shapes and sizes. Such embodiments may provide for a greater variety of distance measurements D such as between the outer most reference points (as illustrated), between two internal or external reference points, or any combination there between. The greater variety may further provide a more robust strain analysis on a particular portion of the component 10 by providing strain measurements across a greater variety of locations.

Furthermore, the values of various dimensions of the strain sensor 40 may depend on, for example, the component 10, the location of the strain sensor 40, the targeted precision of the measurement, application technique, and optical measurement technique. For example, in some embodiments, the strain sensor 40 may comprise a length and width ranging from less than 1 millimeter to greater than 300 millimeters. Moreover, the strain sensor 40 may comprise any thickness that is suitable for application and subsequent optical identification/measurement without significantly impacting the performance of the underlying component 10. Notably, this thickness may be a positive thickness away from the surface 11 (such as when additive techniques are utilized) or a negative thickness into the surface 11 (such as when subtractive techniques are utilized). For example, in some embodiments, the strain sensor 40 may comprise a thickness of less than from about 0.01 millimeters to greater than 1 millimeter. In some embodiments, the strain sensor 40 may have a substantially uniform thickness. Such embodiments may help facilitate more accurate measurements for subsequent strain calculations between the first and second reference points 41 and 42.

In some embodiments, the strain sensor 40 may comprise a positively applied square or rectangle wherein the first and second reference points 41 and 42 comprise two opposing sides of said square or rectangle. In other embodiments, the strain sensor 40 may comprise at least two applied reference points 41 and 42 separated by a negative space 45 (i.e., an area in which the strain sensor material is not applied). The negative space 45 may comprise, for example, an exposed portion of the exterior surface 11 of the component 10. Alternatively or additionally, the negative space 45 may comprise a subsequently applied contrasting (i.e. visually contrasting, contrasting in the ultraviolet or infrared spectrum, or contrasting in any other suitable range of wavelengths in the electromagnetic spectrum) material that is distinct from the material of the at least two reference points 41 and 42 (or vice versa).

As illustrated in FIG. 2, in some embodiments, the strain sensor 40 may include a unique identifier 47 (hereinafter "UID"). The UID 47 may comprise any type of barcode, label, tag, serial number, pattern or other identifying system that facilitates the identification of that particular strain sensor 40. In some embodiments, the UID 47 may additionally or alternatively comprise information about the component 10 or the overall assembly that the strain sensor 40 is configured on. The UID 47 may thereby assist in the identification and tracking of particular strain sensors 40, components 10 or even overall assemblies to help correlate measurements for past, present and future operational tracking.

The strain sensor 40 may thereby be configured in one or more of a variety of locations of various components 10. For example, as discussed above, the strain sensor 40 may be configured on a blade, vane, nozzle, shroud, rotor, transition piece or casing. In such embodiments, the strain sensor 40 may be configured in one or more locations known to experience various forces during unit operation such as on or proximate airfoils, platforms, tips or any other suitable location. Moreover, the strain sensor 40 may be configured in one or more locations known to experience elevated temperatures. For example, the strain sensor 40 may be configured on a hot gas path or combustion turbine component 10.

As discussed herein and as shown in FIG. 1, multiple strain sensors 40 may be configured on a single component 10 or on multiple components 10. For example, a plurality of strain sensors 40 may be configured on a single component 10 (e.g., a turbine blade) at various locations such that the strain may be determined at a greater number of locations about the individual component 10. Alternatively or additionally, a plurality of like components 10 (e.g., a plurality of turbine blades) may each have a strain sensor 40 configured in a standard location so that the amount of strain experienced by each specific component 10 may be compared to other like components 10. In even some embodiments, multiple different components 10 of the same assembly (e.g., blades and vanes for the same turbine in turbine component embodiments) may each have a strain sensor 40 configured thereon so that the amount of strain experienced at different locations within the overall assembly may be determined.

It should be understood that the present disclosure is not limited to strain sensors 40 as illustrated herein. Rather, any suitable surface feature configured on a turbine component 10, such as on the exterior surface 11 thereof, is within the scope and spirit of the present disclosure. Examples of other suitable surface features include surfaces adjacent cooling holes that are defined in the exterior surface (or potentially cooling holes themselves), coating layers applied to the exterior surface 11 (wherein the exterior surface 11 is defined as that of a base component of the turbine component 10), etc.

Figure 3:
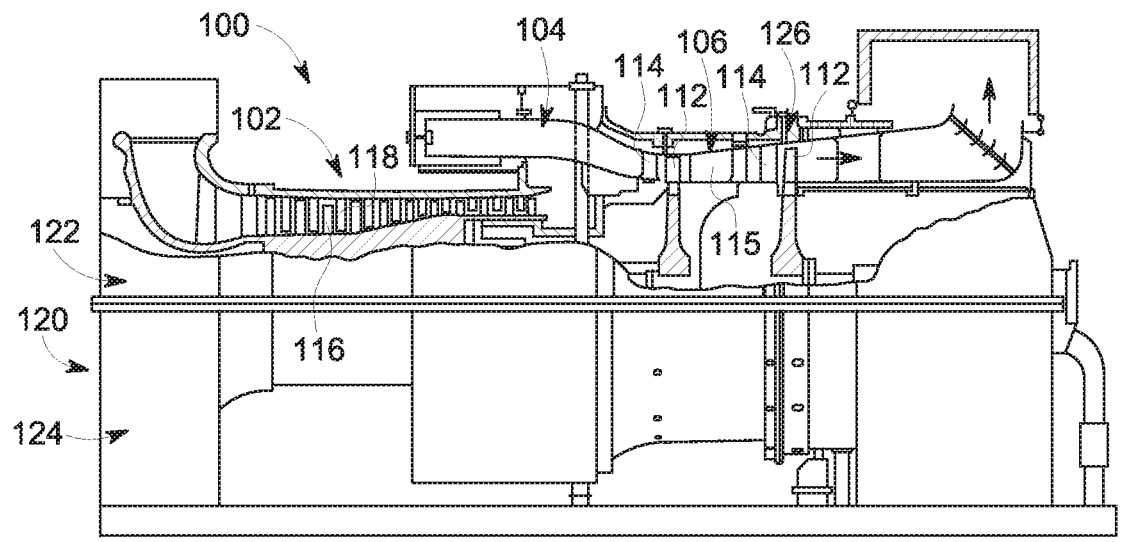
FIG. 3 is a side partial cross-sectional view of a gas turbine in accordance with one or more embodiments of the present disclosure.
Figure 4:
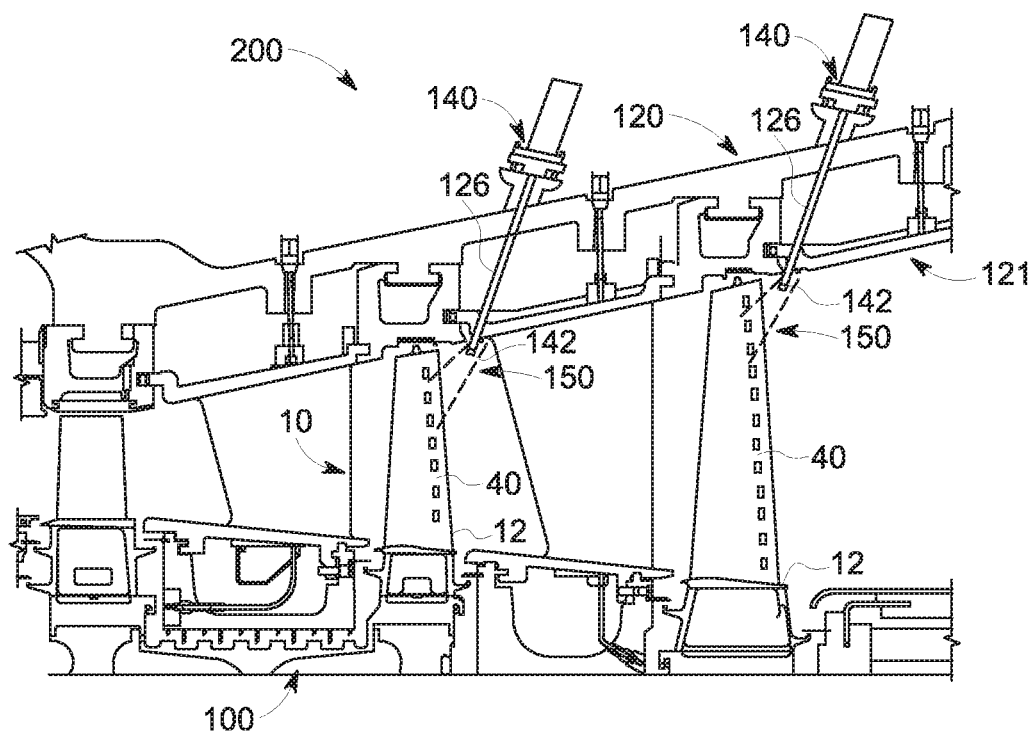
FIG. 4 another side partial cross-sectional view of a gas turbine in accordance with one or more embodiments of the present disclosure
Figure 5:
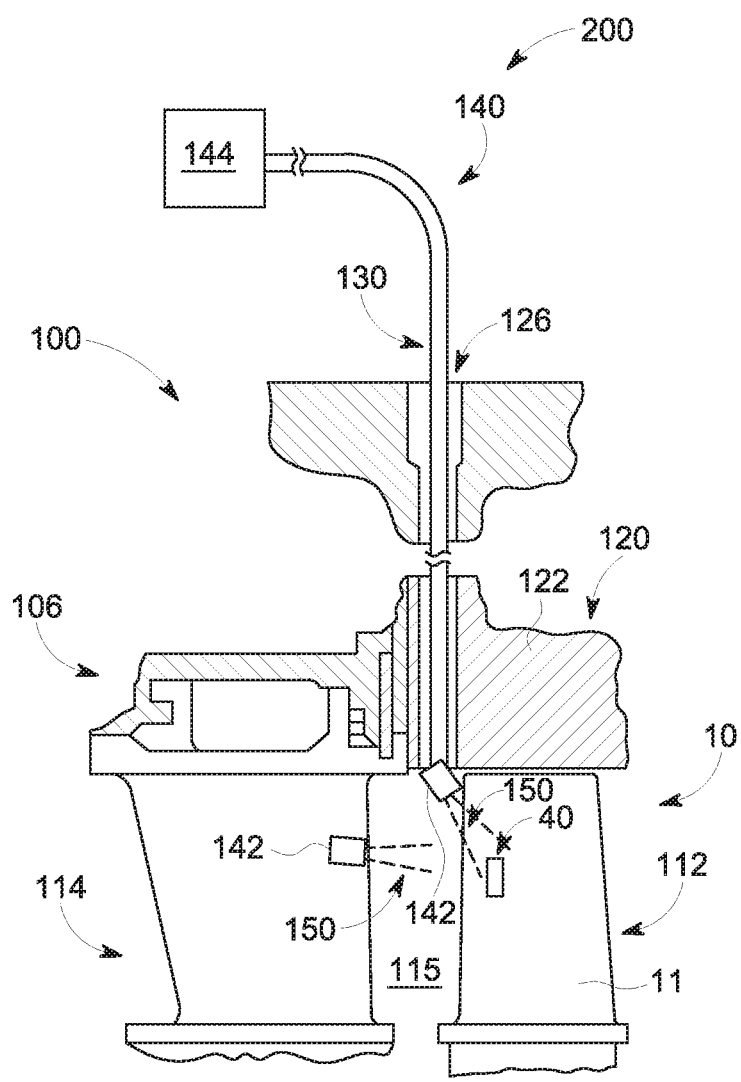
FIG. 5 is a cross-sectional view of a portion of a gas turbine in accordance with one or more embodiments of the present disclosure.

Referring now to FIG. 3, a component 10 (with one or more surface features 40 configured thereon) may be disposed for operation within a turbomachine 100, such as a gas turbine 100 as illustrated, steam turbine, or other turbomachine. Turbomachine 100 may include a compressor section 102, a combustor section 104, and a turbine section 106. Generally, the compressor section 102 provides a flow of pressurized air to the combustor section 104 wherein the pressurized air is mixed with fuel and the mixture combusted to generate a working fluid or hot gas stream. The working fluid is flowed through the turbine section 106, causing rotation of various rotatable components within the turbine section 106, which in turn drives the compressor section 102 (and rotation of various rotatable components thereof). As shown, the turbine section 106 includes one or more stages of turbine blades 112 and nozzles 114 which extend radially across a hot gas stream flow annulus 115. Compressor section 102 additionally includes one or more stages of rotor blades 116 and stator vanes 118. A casing 120 extends around and encloses the compressor section 102, combustor section 104 and turbine section 106. As illustrated, the casing 120 may be formed from two or more sections. In the embodiment shown, the casing includes a first shell 122 and a second shell 124 which form the casing 120.

The casing 120 may include defined therein one or more access ports 126 to facilitate temporary or permanent access to the interior of the turbomachine 100 such as for periodic inspection of components of the turbomachine 100. During operation of the gas turbine each of the ports 126 may be closed by a suitable plug or may be sealed by whatever inspection device is inserted therein.

With reference to FIGS. 1-5, a system 200 is illustrated for monitoring a component 10 in a turbomachine 100. The system 200 may generally comprise a strain sensor 40 comprising at least two reference points 41 and 42 disposed on a surface 11 of the component 10. The system 200 may further comprise a data acquisition device 140 (e.g., camera or infrared sensor) connected to the turbomachine 100 comprising a field of view 150, wherein the field of view 150 is positioned to at least periodically capture the strain sensor 40 on the component 10. As used herein, field of view 150 may refer to any area wherein the data acquisition device 140 can image, read or otherwise capture information from the strain sensor 40 within that area. The field of view 150 may be large enough to at least capture the strain sensor 40, and may potentially be large enough to capture an entire component 10 (such as when the component 10 comprises multiple strain sensors 40). In some embodiments, the system 200 may comprise a set of components 10 (e.g., a set of first stage turbine blades) and a plurality of strain sensors 40 wherein at least two (e.g., half or all) of the set of components 10 comprise strain sensors 40.

The data acquisition device 140 may be connected to the turbomachine 100 at a variety of locations and in a variety of different configurations. For example, the data acquisition device 140 may be connected to an interior surface 121 of the casing 120 of the turbomachine 100. In some embodiments, the data acquisition device 140 may be connected to a port 126 in the casing 120 of the turbomachine 100. In even some embodiments, the data acquisition device 140 may be connected to a component 10, such as a stationary component, that is disposed adjacent the component 10 comprising the strain sensor 40. For example, when the strain sensor 40 being monitored is disposed on the turbine blade 112, the data acquisition device 140 may be connected to an adjacent nozzle 114, casing 110 or other adjacent component 10.

The data acquisition device 140 may be connected to the turbomachine 100 in a variety of ways that facilitate different utilization parameters. For example, in some embodiments, the data acquisition device 140 may be permanently connected to the turbomachine 100 such that it may be utilized during operation of the turbomachine 100 or at least without partial or full disassembly of the turbomachine 100. For example, the data acquisition device may be bolted, welded, screwed, adhered or otherwise integrated into the turbomachine 100. In other embodiments, the data acquisition device 140 may be temporarily connected to the turbomachine 100 such that it may be used during outages or stoppage periods. For example, the data acquisition device may be temporarily latched, clamped or stuck to the turbomachine 100.

The data acquisition device 140 connected to the turbomachine 100 may thus be utilized during operation of the turbomachine 100, during stoppage of the turbomachine 100 and/or during partial or complete disassembly of the turbomachine 100. For example, if the data acquisition device 140 is connected to the turbomachine 100 when the turbomachine 100 is operating, the data acquisition device 140 may at least periodically capture the strain sensor 40 when the turbomachine 100 is operating. In some such embodiments, the component 10 may comprise a rotating component (e.g., turbine blade 112) and the data acquisition device 140 may periodically capture the strain sensor 40 when the component 10 rotates into the field of view 150. In other embodiments, the component 10 may comprise a stationary component, but the data acquisition device 140 may be connected to a rotating component such that as the field of view 150 of the data acquisition device 140 rotates around the turbomachine 100, it periodically captures the strain sensor 40.

While specific locations, connection configurations and operational examples have been disclosed herein between the data acquisition device 140 and turbomachine 100 (and its components 10) it should be appreciated that these are not intended to be limiting examples and other variations may additionally or alternatively be realized.

Data acquisition device 140 can comprise any device or combination of devices suitable for capturing an image of, reading, or otherwise collect information from one or more strain sensors 140. A data acquisition device 140 may, for example, include an image capture device 142 and a computing device 144. The image capture device 142 may generally be in communication with various components such as a lens and optical system for receiving and processing light from the lens to generate images. In some embodiments, for example, image capture device 142 may be a camera sensor which receives and processes light from a camera lens to generate images, such as digital images, as is generally understood. In some embodiments, the image capture device 142 may comprise an infrared camera. In some embodiments, the image capture device 142 may comprise a light source to provide additional lighting when capturing the strain sensor 40.

Image capture device 142 may be in communication with computing device 144 such as via a communication link 130 that can be hardwired or wireless. Computing device 144 may generally include suitable hardware and/or software for storing and analyzing the images from the image capture device 142 and data acquisition device 140 generally. Such hardware and/or software may, for example, generally analyze surface features. For example, strain sensors 40 may be analyzed to determine whether deformation and strain have occurred as discussed above.

Computing device 144 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the computing device 144 to perform various functions.

In alternative embodiments, other suitable data acquisition devices 140, such as electrical field scanners or devices which include other suitable imaging apparatus, may be utilized.

Notably, analysis of a component 10 by a data acquisition device 140 may be performed when the component 10 is in situ. A component 10 is in situ when it disposed within an assembly such as a turbomachine, such as within a section 102, 104, 106 of the turbomachine 100. Notably, in some embodiments the entire casing 120 may surround the component 10 when such in situ analysis is occurring. In even some embodiments, analysis of the component 10 by data acquisition device 140 may occur while the turbomachine is operating, including when various components are in rotation.

For example, the data acquisition device 140 may capture information from one or more strain sensors 40 on or more components 10 while using a variety of methodologies to correlate the captured information with the correct strain sensor 40 and/or component 10. In some embodiments, the data acquisition device 140 may capture information from the strain sensor 40 itself that helps identify the particular strain sensor 40 or component 10 (e.g., when the strain sensor 40 comprises serial or tagging information). In other embodiments, the data acquisition device 140 may be synched such as by knowing the rotational position of the relative component 10 containing the strain sensor 40. In such embodiments, the information from the data acquisition device 140 may be correlated with the appropriate strain sensors 40 or components 10 based on relative motion or timing. It should be appreciated that any other suitable method may be used to correlate data captured from a strain sensor 40 by a data acquisition device 140 to that particular strain sensor 40 and/or component 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for assessing strain of a rotating component in a turbomachine, the system comprising:
   a passive strain indicator comprising at least two reference points disposed on a surface of the rotating component; and
   a data acquisition device connected to a stationary nozzle of the turbomachine adjacent the rotating component having the passive strain indicator, the data acquisition device comprising an image capture device and a computing device in communication with the image capture device, the image capture device comprising an optical system, a camera lens having a field of view, and a light source positioned to direct light onto the passive strain indicator;
   wherein the field of view is positioned to at least periodically capture the passive strain indicator on the component, when the component is in situ within a casing of the turbomachine; and
   wherein the computing device is configured to analyze images of the passive strain indicator and determine whether the rotating component has experienced strain.

2. The system of claim 1, wherein the rotating component comprises a rotating turbine blade.

3. The system of claim 1, wherein the data acquisition device is connected to the turbomachine when the turbomachine is operating.

4. The system of claim 3, wherein the field of view of the data acquisition device at least periodically captures the passive strain indicator when the turbomachine is operating.

5. The system of claim 4, wherein the field of view of the data acquisition device periodically captures the passive strain indicator when the rotating component rotates into the field of view.

6. The system of claim 1, wherein the field of view periodically captures the entire rotating component.

7. A system for assessing strain of a set of rotating components in a turbomachine, the system comprising:
   a set of rotating components disposed within a casing of the turbomachine;
   a plurality of passive strain indicators, each passive strain indicator of the plurality of passive strain indicators comprising at least two reference points, wherein at least one passive strain indicator is disposed on a respective surface of at least two rotating components of the set of rotating components; and
   a data acquisition device connected to a stationary nozzle of the turbomachine adjacent the at least two rotating components having the passive strain indicators, the data acquisition device comprising an image capture device and a computing device in communication with the image capture device, the image capture device comprising an optical system, a camera lens having a field of view, and a light source positioned to direct light onto the passive strain indicator;

wherein the field of view is positioned to at least periodically capture the passive strain indicator on the at least two rotating components of the set of rotating components, when the at least two rotating components are in situ within the casing of the turbomachine; and wherein the computing device is configured to analyze images of the passive strain indicator and determine whether at least one of the at least two rotating components has experienced strain.

8. The system of claim 7, wherein the set of rotating components comprises a set of rotating turbine blades.

9. The system of claim 7, wherein at least one passive strain indicator is disposed on the surface of each of the rotating components of the set of rotating components.

10. The system of claim 7, wherein the data acquisition device is connected to the turbomachine when the turbomachine is operating.

11. The system of claim 8, wherein the field of view of the data acquisition device at least periodically captures each of the plurality of passive strain indicators when the turbomachine is operating.

* * * * *